US008762158B2

(12) United States Patent
Kim et al.

(10) Patent No.: US 8,762,158 B2
(45) Date of Patent: Jun. 24, 2014

(54) DECODING METHOD AND DECODING APPARATUS THEREFOR

(75) Inventors: Hyun-wook Kim, Suwon-si (KR); Han-gil Moon, Seoul (KR); Sang-hoon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 13/198,763

(22) Filed: Aug. 5, 2011

(65) Prior Publication Data

US 2012/0035937 A1 Feb. 9, 2012

Related U.S. Application Data

(60) Provisional application No. 61/371,294, filed on Aug. 6, 2010.

(30) Foreign Application Priority Data

Jul. 13, 2011 (KR) ........................ 10-2011-0069496

(51) Int. Cl.

| | |
|---|---|
| ***G06F 15/00*** | (2006.01) |
| ***G10L 25/00*** | (2013.01) |
| ***G10L 19/00*** | (2013.01) |
| ***G10L 21/00*** | (2013.01) |
| ***G10L 19/02*** | (2013.01) |
| ***G10L 25/90*** | (2013.01) |
| ***G10L 25/93*** | (2013.01) |
| ***G10L 19/06*** | (2013.01) |
| ***G10L 19/12*** | (2013.01) |
| ***G10L 21/02*** | (2013.01) |
| ***G10L 21/04*** | (2013.01) |

(52) U.S. Cl.

USPC ........... 704/500; 704/200; 704/201; 704/202; 704/203; 704/204; 704/205; 704/206; 704/207; 704/208; 704/209; 704/210; 704/211; 704/212; 704/213; 704/214; 704/215; 704/216; 704/217; 704/218; 704/219; 704/220; 704/222; 704/223; 704/224; 704/225; 704/226; 704/227; 704/228; 704/229; 704/230; 704/501; 704/502; 704/503; 704/504

(58) Field of Classification Search

CPC .. H05K 999/99; H04B 1/665; G11C 2207/16; G10L 15/16; G10L 19/0212; G10L 25/90; G10L 25/93; G10L 25/78; G10L 21/04; G10L 19/005; G10L 19/10; G10L 19/12; G10L 21/0208; G10L 19/008; G10L 19/00

USPC .................................. 704/200–230, 500–504

See application file for complete search history.

(56) References Cited

U.S. PATENT DOCUMENTS

| | | | | |
|---|---|---|---|---|
| 5,394,473 | A * | 2/1995 | Davidson | 704/200.1 |
| 5,479,562 | A * | 12/1995 | Fielder et al. | 704/229 |

(Continued)

FOREIGN PATENT DOCUMENTS

| | | | |
|---|---|---|---|
| KR | 2000-0014812 | A | 3/2000 |
| KR | 10-2007-0003593 | A | 1/2007 |

OTHER PUBLICATIONS

Dal Tracy Yang, Chris Kyriakakis, and C.-C. Jay Kuo, "High-Fidelity Multichannel Audio Coding", EURASIP Book Series on Signal Processing and Communications, vol. 2.*

(Continued)

*Primary Examiner* — Paras D Shah
*Assistant Examiner* — Anne Thomas-Homescu
(74) *Attorney, Agent, or Firm* — Sughrue Mion, PLLC

(57) ABSTRACT

A method and apparatus for generating synthesis audio signals are provided. The method includes decoding a bitstream; splitting the decoded bitstream into n sub-band signals; generating n transformed sub-band signals by transforming the n sub-band signals in a frequency domain; and generating synthesis audio signals by respectively multiplying the n transformed sub-band signals by values corresponding to synthesis filter bank coefficients.

22 Claims, 9 Drawing Sheets

(56) References Cited

U.S. PATENT DOCUMENTS

| | | | | |
|---|---|---|---|---|
| 5,864,800 | A * | 1/1999 | Imai et al. | 704/229 |
| 6,591,241 | B1 * | 7/2003 | Absar et al. | 704/504 |
| 6,680,972 | B1 * | 1/2004 | Liljeryd et al. | 375/240 |
| 6,721,711 | B1 * | 4/2004 | Hoshiai | 704/500 |
| 6,823,310 | B2 * | 11/2004 | Ishito et al. | 704/270 |
| 7,236,839 | B2 * | 6/2007 | Fujita et al. | 700/94 |
| 7,583,805 | B2 * | 9/2009 | Baumgarte et al. | 381/61 |
| 7,647,226 | B2 * | 1/2010 | Sato | 704/260 |
| 8,285,543 | B2 * | 10/2012 | Truman et al. | 704/228 |
| 8,296,143 | B2 * | 10/2012 | Kudoh | 704/258 |
| 2004/0030546 | A1 * | 2/2004 | Sato | 704/207 |
| 2004/0260544 | A1 * | 12/2004 | Kikumoto | 704/221 |
| 2007/0011002 | A1 * | 1/2007 | Chinen et al. | 704/229 |
| 2007/0112559 | A1 * | 5/2007 | Schuijers et al. | 704/203 |
| 2007/0140498 | A1 * | 6/2007 | Moon et al. | 381/20 |
| 2007/0255572 | A1 * | 11/2007 | Miyasaka et al. | 704/500 |
| 2007/0299656 | A1 * | 12/2007 | Son et al. | 704/205 |
| 2008/0027733 | A1 * | 1/2008 | Oshikiri et al. | 704/500 |
| 2008/0046237 | A1 * | 2/2008 | Zopf et al. | 704/228 |
| 2008/0071550 | A1 * | 3/2008 | Oh et al. | 704/500 |
| 2008/0077412 | A1 * | 3/2008 | Oh et al. | 704/500 |
| 2008/0091415 | A1 * | 4/2008 | Schafer | 704/200.1 |
| 2008/0120095 | A1 * | 5/2008 | Oh et al. | 704/203 |
| 2008/0126082 | A1 * | 5/2008 | Ehara et al. | 704/205 |
| 2008/0126102 | A1 * | 5/2008 | Shirakawa et al. | 704/500 |
| 2008/0167880 | A1 * | 7/2008 | Seo et al. | 704/500 |
| 2008/0172223 | A1 * | 7/2008 | Oh et al. | 704/205 |
| 2008/0189117 | A1 * | 8/2008 | Oh et al. | 704/500 |
| 2008/0262835 | A1 * | 10/2008 | Oshikiri | 704/205 |
| 2008/0312912 | A1 * | 12/2008 | Choo et al. | 704/203 |
| 2009/0006081 | A1 * | 1/2009 | Oh et al. | 704/200.1 |
| 2009/0089049 | A1 * | 4/2009 | Moon et al. | 704/200.1 |
| 2009/0157393 | A1 * | 6/2009 | Tsushima et al. | 704/203 |
| 2009/0192792 | A1 * | 7/2009 | Lee et al. | 704/219 |
| 2009/0198489 | A1 * | 8/2009 | Lee et al. | 704/205 |
| 2009/0198499 | A1 * | 8/2009 | Lee et al. | 704/500 |
| 2009/0198501 | A1 * | 8/2009 | Jeong et al. | 704/500 |
| 2009/0210236 | A1 * | 8/2009 | Moon et al. | 704/500 |
| 2009/0216527 | A1 * | 8/2009 | Oshikiri | 704/228 |
| 2009/0228284 | A1 * | 9/2009 | Moon et al. | 704/500 |
| 2009/0248407 | A1 * | 10/2009 | Oshikiri | 704/226 |
| 2009/0259478 | A1 * | 10/2009 | Nomura et al. | 704/500 |
| 2010/0010809 | A1 * | 1/2010 | Oh et al. | 704/206 |
| 2010/0023322 | A1 * | 1/2010 | Schnell et al. | 704/211 |
| 2010/0169081 | A1 * | 7/2010 | Yamanashi et al. | 704/203 |
| 2010/0198603 | A1 * | 8/2010 | Paranjpe | 704/500 |
| 2010/0211399 | A1 * | 8/2010 | Liljeryd et al. | 704/500 |
| 2010/0228541 | A1 * | 9/2010 | Oshikiri | 704/203 |
| 2010/0228557 | A1 * | 9/2010 | Chen et al. | 704/500 |
| 2010/0256980 | A1 * | 10/2010 | Oshikiri et al. | 704/500 |
| 2010/0286990 | A1 * | 11/2010 | Biswas et al. | 704/500 |
| 2010/0318350 | A1 * | 12/2010 | Endo et al. | 704/209 |
| 2011/0015933 | A1 * | 1/2011 | Maeda et al. | 704/500 |
| 2011/0035227 | A1 * | 2/2011 | Lee et al. | 704/500 |
| 2011/0038423 | A1 * | 2/2011 | Lee et al. | 375/240.26 |
| 2011/0040556 | A1 * | 2/2011 | Moon et al. | 704/205 |
| 2011/0040566 | A1 * | 2/2011 | Moon et al. | 704/500 |
| 2011/0046759 | A1 * | 2/2011 | Kim et al. | 700/94 |
| 2011/0046963 | A1 * | 2/2011 | Kim et al. | 704/500 |
| 2011/0046964 | A1 * | 2/2011 | Moon et al. | 704/500 |
| 2011/0060599 | A1 * | 3/2011 | Kim et al. | 704/501 |
| 2011/0106529 | A1 * | 5/2011 | Disch | 704/205 |
| 2011/0173005 | A1 * | 7/2011 | Hilpert et al. | 704/500 |
| 2011/0251846 | A1 * | 10/2011 | Liu et al. | 704/500 |
| 2011/0257980 | A1 * | 10/2011 | Gao | 704/500 |
| 2011/0313778 | A1 * | 12/2011 | Son et al. | 704/500 |
| 2011/0320211 | A1 * | 12/2011 | Liu et al. | 704/500 |
| 2012/0010891 | A1 * | 1/2012 | Kim et al. | 704/500 |
| 2012/0065983 | A1 * | 3/2012 | Ekstrand et al. | 704/500 |
| 2012/0158411 | A1 * | 6/2012 | Chinen et al. | 704/500 |
| 2013/0246075 | A1 * | 9/2013 | Oshikiri | 704/500 |

OTHER PUBLICATIONS

Sinnie Lau and Alex Chwu, A Common Transform Engine for MPEG and AC3 Decoder, IEEE Transactions on Consumer Electronics, vol. 43, No. 3, Aug. 1997.*

* cited by examiner

DECODING METHOD AND DECODING APPARATUS THEREFOR

CROSS-REFERENCE TO RELATED APPLICATION

This application claims the benefit of U.S. Provisional Application No. 61/371,294 filed on Aug. 6, 2010, in the USPTO and claims priority from Korean Patent Application No. 10-2011-0069496, filed on Jul. 13, 2011, in the Korean Intellectual Property Office, the disclosures of which are incorporated by reference herein in their entirety.

BACKGROUND

1. Field

Methods and apparatuses consistent with the present disclosure relate to decoding bitstreams and, more particularly, to restoring an original audio signal by decoding a bitstream including an audio signal.

2. Description of the Related Art

An audio decoder restores a sound-reproducible audio signal by receiving an audio bitstream and decoding the received audio bitstream. The audio bitstream may be generated by encoding an audio signal according to a predetermined standard, such as a Moving Picture Experts Group-1 Layer-3 (MP3) standard. In this case, the audio decoder is an example of an MP3 decoder. In addition, the restored audio signal may be a stereo signal or a multi-channel audio signal.

The MP3 decoder uses Pseudo Quadrature Mirror Filter technology. The MP3 decoder synthesizes a decoded audio signal so as to be an original multi-channel audio signal. The MP3 decoder also processes a restored bitstream in a time domain. In addition, the MP3 decoder synthesizes the restored bitstream so as to be a multi-channel audio signal by using a complicated operation, such as convolution.

Thus, since complexity of the operation performed by the MP3 decoder is very high, a large-capacity memory and a high-performance processor are required for high-speed operation. In addition, since the MP3 decoder processes a restored bitstream in the time domain, the MP3 decoder is not compatible with a multi-channel codec for processing a bitstream in a transform domain.

SUMMARY OF THE INVENTION

Exemplary embodiments provide a decoding apparatus compatible with a codec for processing a bitstream in a transform domain and a decoding method thereof.

Exemplary embodiments also provides a decoding apparatus for enhancing sound quality and a decoding method thereof.

According to an aspect of an exemplary embodiment, there is provided a method of generating synthesis audio signals, the method including decoding a bitstream; splitting the decoded bitstream into n sub-band signals; generating n transformed sub-band signals by transforming the n sub-band signals in a frequency domain; and generating synthesis audio signals by respectively multiplying the n transformed sub-band signals by values corresponding to synthesis filter bank coefficients.

The n transformed sub-band signals may be generated by fast Fourier transforming the n sub-band signals.

The generating of the synthesis audio signals may be performed in the frequency domain.

The generating of the synthesis audio signals may be performed in a fast Fourier transform (FFT) domain.

The values corresponding to the synthesis filter bank coefficients may be calculated based on synthesis filter bank coefficients extracted from the bitstream.

The values corresponding to the synthesis filter bank coefficients may be values obtained by fast Fourier transforming synthesis filter values calculated based on the synthesis filter bank coefficients.

The generating of the n transformed sub-band signals may include: inverse modified discrete cosine transforming the n sub-band signals; and generating the n transformed sub-band signals by fast Fourier transforming the n inverse modified discrete cosine transformed sub-band signals.

The method may further include inverse fast Fourier transforming the synthesis audio signals.

The method may further include inverse modified discrete cosine transforming the synthesis audio signals.

The generating of the synthesis audio signals may include: adjusting at least one of a phase and an amplitude of each of the n transformed sub-band signals to match a synthesis filter; and generating the synthesis audio signals by multiplying the n adjusted transformed sub-band signals by the values corresponding to the synthesis filter bank coefficients.

The method may further include multiplexing the synthesis audio signals.

The decoding of the bitstream may include: unpacking and decoding the bitstream; dequantizing and rearranging the decoded bitstream; and splitting the dequantized and rearranged bitstream into at least one channel.

According to another aspect of an exemplary embodiment, there is provided a decoding apparatus including a decoding core unit which decodes a bitstream and splitting the decoded bitstream into n sub-band signals; and a synthesis unit which generates n transformed sub-band signals by transforming the n sub-band signals in a frequency domain and generates synthesis audio signals by respectively multiplying the n transformed sub-band signals by values corresponding to synthesis filter bank coefficients.

According to another aspect of an exemplary embodiment, there is provided a method of generating a synthesis audio signal, the method comprising decoding a bitstream into at least one channel; extracting synthesis filter bank coefficients from the bitstream; and for a channel of the at least one channel: splitting the channel into n sub-band signals; transforming a sub-band signal of the n sub-band signals into the frequency domain; calculating, for the transformed sub-band signal, a value based on the extracted synthesis filter bank coefficients; and multiplying the transformed sub-band signal by the calculated value to generate a synthesis audio signal.

BRIEF DESCRIPTION OF THE DRAWINGS

The above and other aspects will become more apparent by describing in detail exemplary embodiments thereof with reference to the attached drawings in which.

DETAILED DESCRIPTION OF EXEMPLARY EMBODIMENTS

A decoding apparatus and a decoding method will now be described more fully with reference to the accompanying drawings, in which exemplary embodiments are shown.

Figure 1:
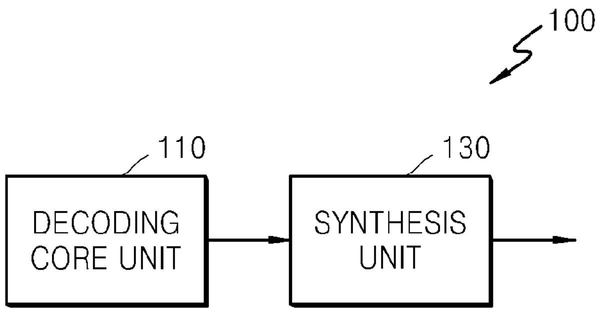
FIG. 1 is a block diagram of a decoding apparatus according to an exemplary embodiment.

FIG. 1 is a block diagram of a decoding apparatus 100 according to an exemplary embodiment.

Referring to FIG. 1, the decoding apparatus 100 includes a decoding core unit 110 and a synthesis unit 130.

The decoding apparatus 100 restores an audio bitstream encoded according to an encoding standard and transmitted. The encoding standard may be the MP3 standard.

The decoding core unit 110 receives an encoded bitstream and decodes the received bitstream.

The synthesis unit 130 splits the bitstream decoded by the decoding core unit 110 into n sub-band signals. In detail, sub-band signals are generated by splitting a bitstream corresponding to an audio signal according to a plurality of frequency bands. For example, an overall frequency band of the audio signal may be split into 32 frequency bands to generate 32 sub-band signals. N transformed sub-band signals are generated by transforming the n sub-band signals in the frequency domain.

Thereafter, the synthesis unit 130 generates synthesis audio signals by respectively multiplying the n transformed sub-band signals by values corresponding to synthesis filter bank coefficients. Hereinafter, the 'values corresponding to synthesis filter bank coefficients' are called 'coefficient-corresponding values'. Alternatively, the operation of splitting the decoded bitstream into the n sub-band signals may be performed by the decoding core unit 110.

The synthesis unit 130 also generates synthesis audio signals by respectively multiplying the n transformed sub-band signals by the coefficient-corresponding values in the frequency domain. In detail, the synthesis unit 130 may generate synthesis audio signals by respectively multiplying the n transformed sub-band signals by the coefficient-corresponding values in a fast Fourier transform (FFT) domain.

As described above, the decoding apparatus 100 multiplies transformed sub-band signals transformed in the frequency domain by coefficient-corresponding values to synthesis a bitstream. Thus, the use of the decoding apparatus 100 may significantly decrease the complexity of operation as compared with a decoding apparatus for synthesizing a bitstream by a convolution operation. Accordingly, the use of the decoding apparatus 100 may allow a decoding speed to increase without a large-capacity memory or a high-performance processor.

In addition, the decoding apparatus 100 may be compatible with a multi-channel codec by synthesizing a bitstream in the frequency domain, such as the FFT domain, without using the time domain.

Figure 2:
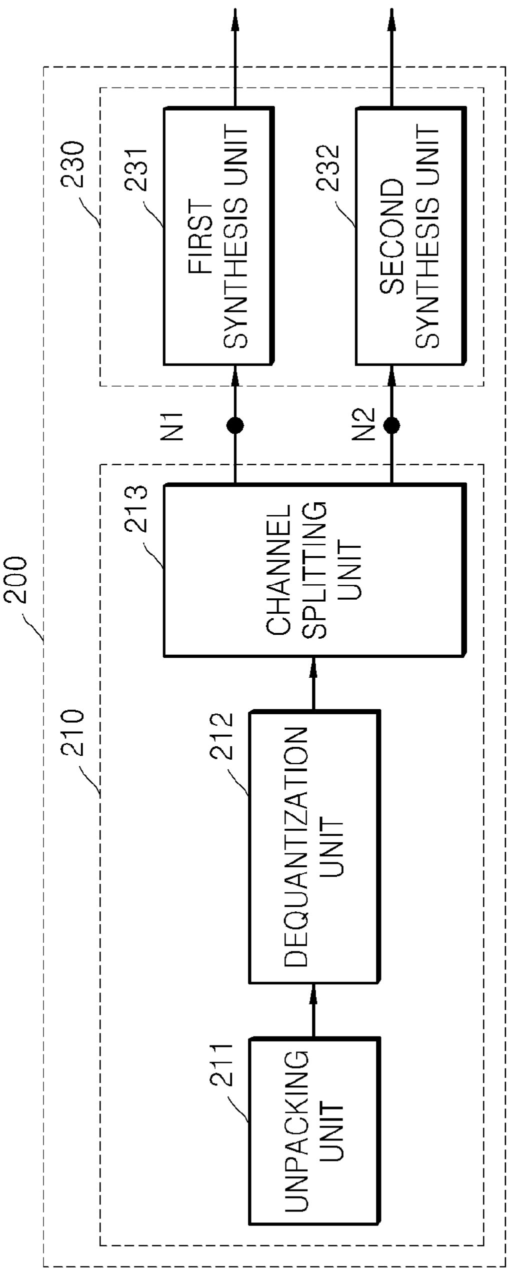
FIG. 2 is a detailed block diagram of the decoding apparatus of FIG. 1, according to an exemplary embodiment.

FIG. 2 is a detailed block diagram of the decoding apparatus 100 of FIG. 1, according to an exemplary embodiment.

A decoding apparatus 200, a decoding core unit 210, and a synthesis unit 230 of FIG. 2 respectively correspond to the decoding apparatus 100, the decoding core unit 110, and the synthesis unit 130 of FIG. 1. Thus, the description made in FIG. 1 is not repeated herein.

Referring to FIG. 2, the decoding apparatus 200 includes the decoding core unit 210 and the synthesis unit 230.

The decoding core unit 210 may include an unpacking unit 211, a dequantization unit 212, and a channel splitting unit 213.

The unpacking unit 211 unpacks a received bitstream. In detail, an encoding apparatus (not shown) for transmitting the bitstream generates the bitstream by compressing an audio signal and transforming the compressed audio signal to a certain format. That is, the unpacking unit 211 detransforms the format of the received bitstream into a format of the signal that existed before the encoding apparatus compressed and transformed the audio signal.

The unpacking unit 211 also decodes the unpacked bitstream. In detail, the decoding may be performed by a Huffman decoding operation. The Huffman decoding operation is an operation of decoding a bitstream using a Huffman coding table and is a lossless compression method mainly used in the Moving Picture Experts Group (MPEG) or the Joint Photographic Experts Group (JPEG) standards.

The dequantization unit 212 dequantizes the bitstream unpacked by the unpacking unit 211 and rearranges the dequantized bitstream in a certain order.

The channel splitting unit 213 splits the bitstream output from the dequantization unit 212 into at least one channel. For example, if the bitstream received by the decoding apparatus 200 includes a stereo audio signal including a left channel and a right channel, the channel splitting unit 213 may split the received bitstream into a signal corresponding to the left channel and a signal corresponding to the right channel. As another example, if the received bitstream includes 5.1 channels, i.e. 6 channels, the channel splitting unit 213 may split the received bitstream into 6 channels. That is, the bitstream may be split into any number of channels. Alternatively, the bitstream may be a single channel.

FIG. 2 illustrates a case where the channel splitting unit 213 splits a bitstream into 2 channels. In this case, a bitstream corresponding to a left channel may be output via a node N1, and a bitstream corresponding to a right channel may be output via a node N2.

The synthesis unit 230 may include at least one synthesis unit for generating synthesis audio signals by synthesizing a bitstream corresponding to a single channel. FIG. 2 illustrates a case where the synthesis unit 230 includes first and second synthesis units 231 and 232.

The synthesis unit 230 generates synthesis audio signals by multiplying each of the bitstreams split by the channel splitting unit 213 by coefficient-corresponding values.

The coefficient-corresponding values are calculated based on synthesis filter bank coefficients extracted from the bitstream received by the decoding apparatus 200. In detail, the synthesis filter bank coefficients may be filter bank coefficients defined in the table B.3 of ISO/IEC 11172-3 of the MP3 standard and provided in the bitstream. The coefficient-corresponding values used in the multiplication operation described above will be described in detail with reference to FIGS. 5 and 6 later.

Each of the first and second synthesis units 231 and 232 included in the synthesis unit 230 generates synthesis audio signals by multiplying transformed sub-band signals corresponding to a corresponding single channel by coefficient-corresponding values corresponding to the transformed sub-band signals.

Figure 3:
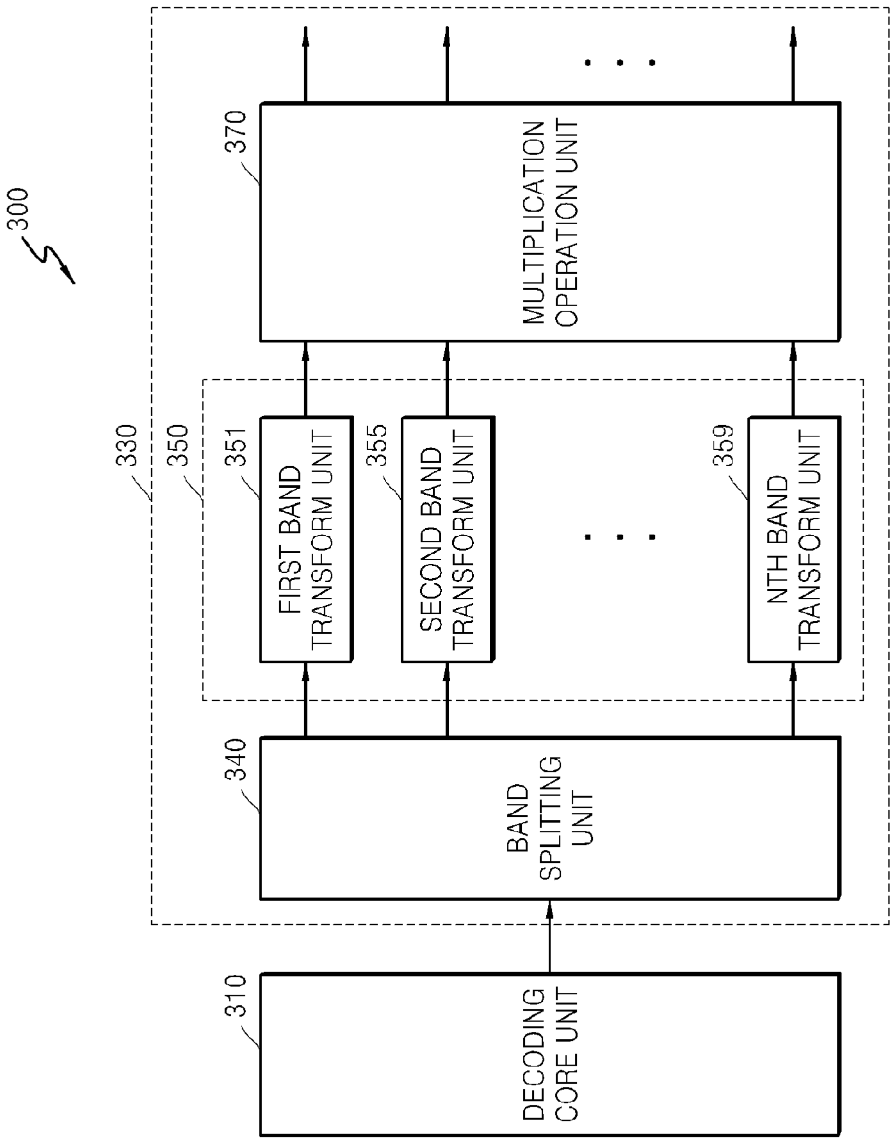
FIG. 3 is a detailed block diagram of the decoding apparatus of FIG. 1, according to another exemplary embodiment.

FIG. 3 is a detailed block diagram of the decoding apparatus 100 of FIG. 1, according to another exemplary embodiment.

Referring to FIG. 3, a decoding apparatus 300 comprises a decoding core unit 310, and a synthesis unit 330. The decoding apparatus 300 of FIG. 3 corresponds to the decoding apparatuses 100 and 200 of FIGS. 1 and 2, respectively. Similarly, the decoding core unit 310 corresponds to the decoding core units 110 and 210 of FIGS. 1 and 2, respectively, and the synthesis unit 330 corresponds to the synthesis units 130 and 230 of FIGS. 1 and 2, respectively. Thus, the description made in FIGS. 1 and 2 is not repeated herein. In detail, the synthesis unit 330 of FIG. 3 corresponds to any one of the first synthesis unit 231 or the second synthesis unit 232 of FIG. 2.

As described above, the operation of splitting a decoded bitstream into n sub-band signals may be performed by the decoding core unit 310 or the synthesis unit 330. FIG. 3 illustrates a case where the synthesis unit 330 includes a band splitting unit 340 for receiving a decoded bitstream corresponding to a single channel and outputting n sub-band signals of the single channel.

Referring to FIG. 3, the synthesis unit 330 includes a band transform unit 350 and a multiplication operation unit 370. The synthesis unit 330 may further include the band splitting unit 340.

The band splitting unit 340 receives a decoded bitstream corresponding to a single channel and outputs n sub-band signals. If the decoding core unit 310 performs the operation of splitting a decoded bitstream into n sub-band signals, the synthesis unit 330 does not include the band splitting unit 340, and the band transform unit 350 directly receives the n sub-band signals from the decoding core unit 310.

In correspondence with receiving the n sub-band signals, the band transform unit 350 includes first to Nth transform units 351, 355, and 359 for performing a multiplication operation for a corresponding sub-band signal. The first to Nth transform units 351, 355, and 359 receive the n sub-band signals and perform a fast Fourier transform (FFT) of the n sub-band signals, respectively. Each of the first to Nth transform units 351, 355, and 359 performs FFT of a received signal.

A detailed configuration and operation of the band transform unit 350 will be described later with reference to FIGS. 4 and 8.

The multiplication operation unit 370 generates synthesis audio signals by multiplying coefficient-corresponding values calculated based on synthesis filter bank coefficients extracted from the bitstream received by the decoding apparatus 300 by n transformed sub-band signals output from the band transform unit 350. The multiplication operation unit 370 may perform the multiplication operation in the frequency domain.

Figure 4:
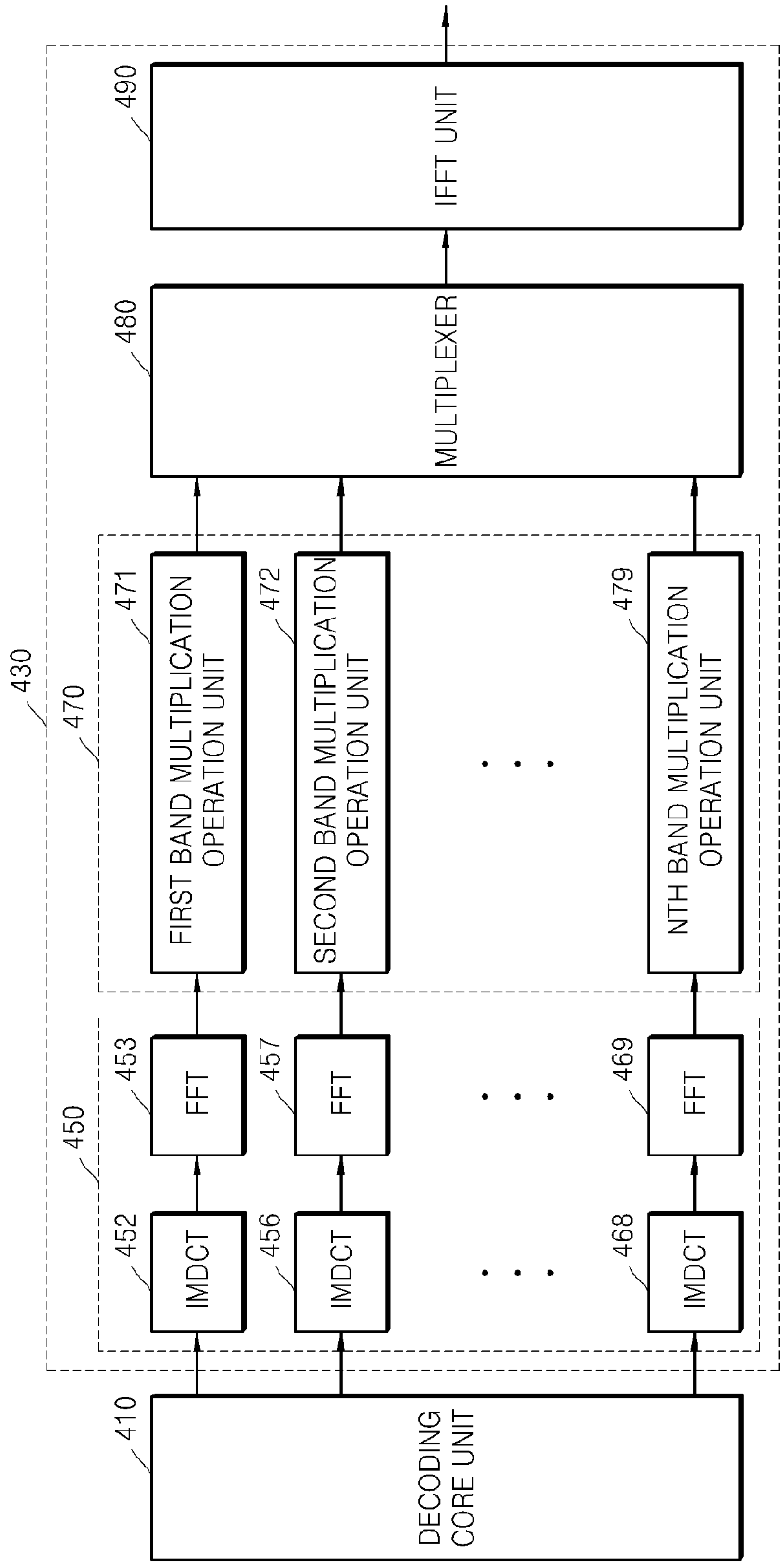
FIG. 4 is a detailed block diagram of a synthesis unit of FIG. 3, according to an exemplary embodiment.

FIG. 4 is a detailed block diagram of the synthesis unit 330 of FIG. 3, according to an exemplary embodiment. Since a decoding core unit 410 and a synthesis unit 430 of FIG. 4 respectively correspond to the decoding core unit 310 and the synthesis unit 330 of FIG. 3, the description made in FIG. 3 is not repeated herein.

However, FIG. 4 illustrates a case where the role performed by the band splitting unit 340 of FIG. 3 is performed by the decoding core unit 410. Thus, unlike the synthesis unit 330, the synthesis unit 430 does not include the band splitting unit 340 and receives n sub-band signals from the decoding core unit 410.

Referring to FIG. 4, a band transform unit 450 includes n inverse modified discrete cosine transform (IMDCT) units and n FFT units. Thus, the band transform unit 450 includes IMDCT units 452, 456 . . . 468 for respectively receiving the n sub-band signals, and FFT units 453, 457, . . . 469 for respectively receiving outputs of the corresponding n IMDCT units 452, 456, . . . 468.

An IMDCT unit (e.g., reference numeral 452) receives a first sub-band signal and outputs a signal obtained by performing an IMDCT on the first sub-band signal.

An FFT unit (e.g., reference numeral 453) receives the signal output from the IMDCT unit (e.g., reference numeral 452) and outputs a first transformed sub-band signal obtained by performing a FFT on the received signal.

A multiplication operation unit 470 includes first to Nth band multiplication operation units 471, 472, . . . 479 for receiving first to nth transformed sub-band signals output from the band transform unit 450.

Each of the first to Nth band multiplication operation units 471, 472, . . . 479 receives a transformed sub-band signal according to a corresponding sub-band and outputs a synthesis audio signal by multiplying the received transformed sub-band signal by a corresponding coefficient-corresponding value. For example, the first band multiplication operation unit 471 receives the first transformed sub-band signal of which an audio signal frequency band corresponds to a first sub-band and multiplies a coefficient-corresponding value corresponding to the first sub-band signal by the first sub-band signal. The second to Nth band multiplication operation units also perform the same multiplication operation as the first band multiplication operation unit 471.

Compared with the synthesis unit 330 of FIG. 3, the synthesis unit 430 may further include a multiplexer 480 and an inverse FFT (IFFT) unit 490.

The multiplexer 480 receives n synthesis audio signals output from the first to Nth band multiplication operation units 471, 472, . . . 479 and outputs a signal by multiplexing the n synthesis audio signals. That is, the multiplexer 480 outputs a single signal by receiving and multiplexing the n synthesis audio signals output from the first to Nth band multiplication operation units 471, 472, . . . 479.

The IFFT unit 490 performs IFFT of the signal output from the multiplexer 480.

Figure 5:
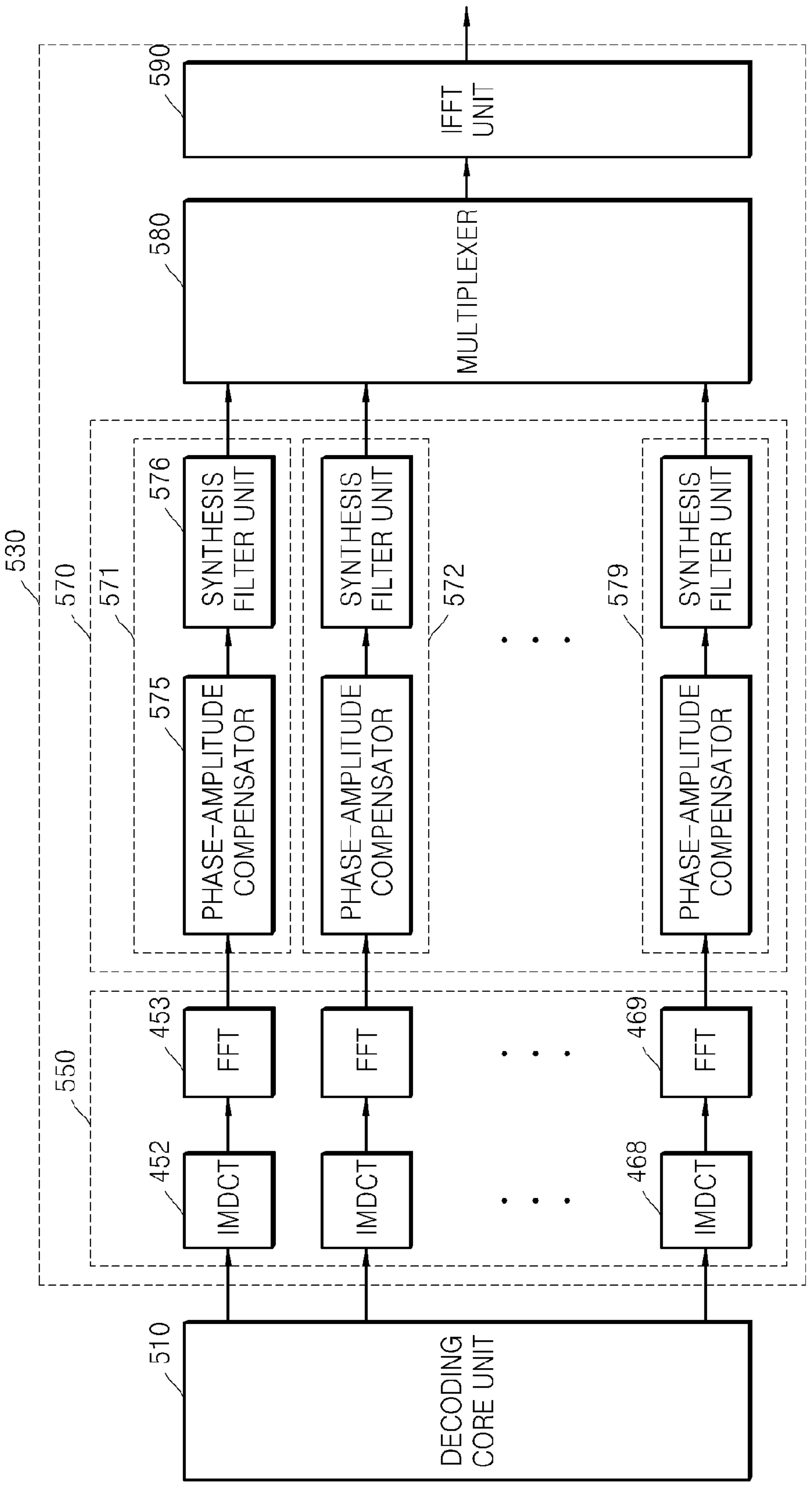
FIG. 5 is a detailed block diagram of a synthesis unit of FIG. 3, according to another exemplary embodiment.

FIG. 5 is a detailed block diagram of the synthesis unit 430 of FIG. 4, according to another exemplary embodiment.

Referring to FIG. 5, since a decoding core unit 510 and a synthesis unit 530 of FIG. 5 respectively correspond to the decoding core unit 410 and the synthesis unit 430 of FIG. 4, the description made in FIG. 4 is not repeated herein.

A band transform unit 550 includes IMDCT units (e.g., reference numeral 452) and FFT units (e.g., reference numeral 453) to output first to nth transformed sub-band signals by performing IMDCT and FFT of first to nth sub-band signals.

Referring to FIG. 5, a multiplication operation unit 570 includes n phase-amplitude compensators (e.g., reference numeral 575) for receiving the first to nth transformed sub-band signals and n synthesis filter units (e.g., reference numeral 576) respectively connected in series to the n phase-amplitude compensators. In detail, the first band multiplication operation unit 571 corresponding to the first band multiplication operation unit 471 of FIG. 4 includes a phase-amplitude compensator 575 for receiving the first transformed sub-band signal corresponding to the first sub-band signal and a synthesis filter unit 576 directly connected to the phase-amplitude compensator 575.

FIG. 6 illustrates graphs for describing signals generated by the multiplication operation unit 570 of FIG. 5, according to an exemplary embodiment. Hereinafter, a configuration and operation of the first band multiplication operation unit 571 included in the multiplication operation unit 570 will be described. The first band multiplication operation unit 571 processes the first transformed sub-band signal corresponding to the first sub-band signal. This processing is described with reference to FIGS. 5 and 6.

The phase-amplitude compensator 575 adjusts at least one of a phase and an amplitude of the first transformed sub-band signal to match a synthesis filter. The synthesis filter is included in the synthesis filter unit 576 to generate a synthesis audio signal.

The synthesis filter unit 576 generates a synthesis audio signal by multiplying the first transformed sub-band signal output from the phase-amplitude compensator 575 by a corresponding coefficient-corresponding value.

Figure 6A:
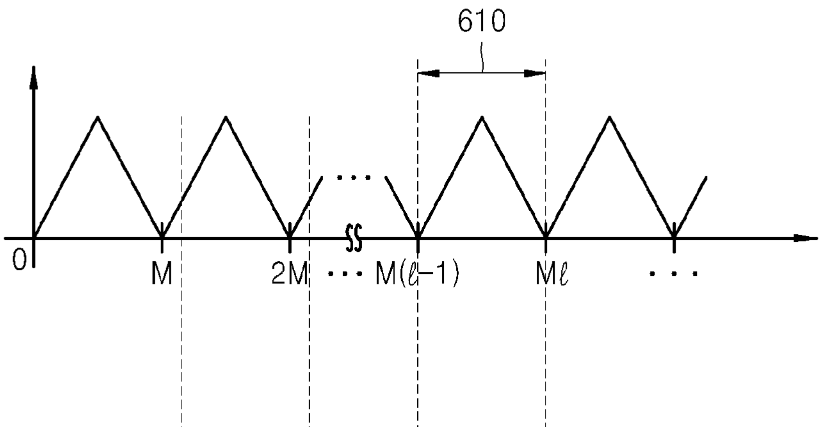
FIGS. 6A to 6C illustrate graphs for describing signals generated by a multiplication operation unit of FIG. 5, according to an exemplary embodiment.
Figure 6B:
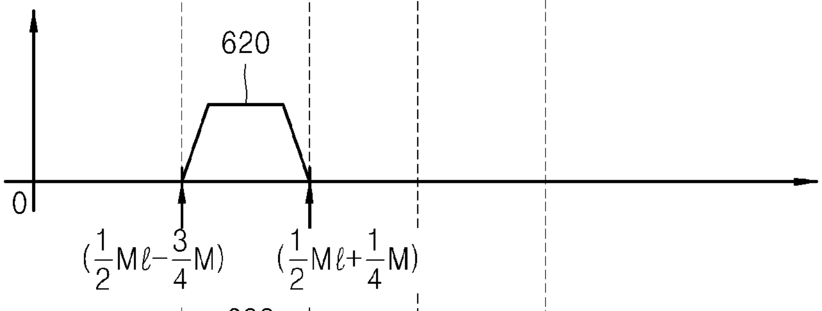
Figure 6C:
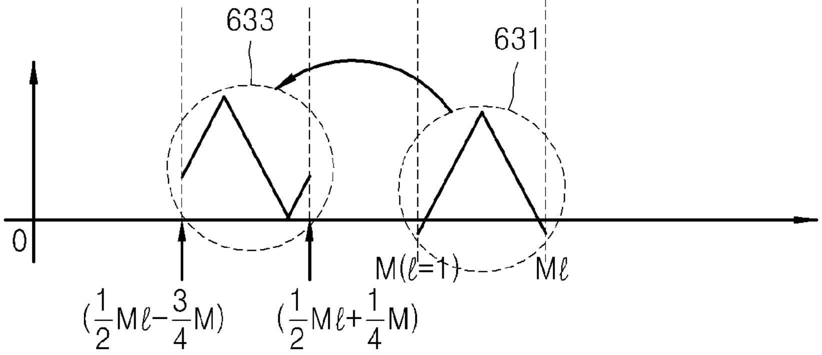

In the graphs shown in FIGS. 6A to 6C, an x-axis indicates a frequency, and a y-axis indicates an amplitude value of a transformed sub-band signal corresponding to an audio signal. FIGS. 6A to 6C illustrate an operation of an lth multiplication operation unit for processing an lth sub-band.

Referring to FIG. 6A, n transformed sub-band signals discriminated from each other according to frequency bands are shown. A case where the frequency bands have M spacing is illustrated. For example, n may be 32, in which case 32 frequency bands are used. The number of frequency bands is not particularly limited.

The lth sub-band has a frequency band from M(l−1) to Ml. A signal referred to as reference numeral 610 in FIG. 6A indicates an lth transformed sub-band signal.

FIG. 6B is a graph for describing a synthesis filter 620 included in the synthesis filter unit 576.

Filter energy of the synthesis filter 620 is focused on a specific frequency band. In detail, the synthesis filter 620 for performing a multiplication operation of a transformed sub-band signal corresponding to an lth sub-band has filter energy focused on a frequency band from ½Ml−¾M to ½Ml+¼M. The synthesis filter bank coefficients described above are parameter values for defining the synthesis filter 620 and may be variously set according to a decoding standard for decoding an audio signal. As described above, the synthesis filter bank coefficients may be filter bank coefficients defined in the table B.3 of ISO/IEC 11172-3 of the MP3 standard.

As shown in FIGS. 6A and 6B, since the lth transformed sub-band signal shown in FIG. 6A has a frequency band different from that of the synthesis filter 620 shown in FIG. 6B, the lth transformed sub-band signal is adjusted to match the synthesis filter 620 by multiplying the lth transformed sub-band signal by its corresponding coefficient-corresponding value.

In detail, at least one of a phase and an amplitude of the lth transformed sub-band signal is adjusted to match the frequency band of the synthesis filter 620.

Referring to FIG. 6C, an adjusted lth transformed sub-band signal 633 is generated by adjusting an lth transformed sub-band signal 631 to match the frequency band of the synthesis filter 620.

In detail, a phase, i.e., a frequency band, of the lth transformed sub-band signal 631 may be shifted from between M(l−1) and Ml to between ½Ml−¾M and ½Ml+¼M. In addition, an amplitude of the lth transformed sub-band signal 631 may be adjusted within the range that can be processed by the synthesis filter 620. Phase and amplitude adjustment values may vary according to a certain standard governing the synthesis filter or a product specification of a decoding apparatus.

When at least one of a phase and an amplitude of a transformed sub-band signal is adjusted, phase and amplitude adjustment values of a transformed sub-band signal corresponding to an odd-th sub-band may be different from phase and amplitude adjustment values of a transformed sub-band signal corresponding to an even-th sub-band.

That is, an lth phase-amplitude compensator (not shown) receives the lth transformed sub-band signal 631 and generates the lth transformed sub-band signal 633 adjusted to match a synthesis filter.

A value of the synthesis filter included in the synthesis filter unit 576 may be defined using Equation 1.

$$g_l(n) = d(n)\cdot\cos\left(\left(k+\frac{1}{2}\right)\cdot(n+16)\cdot\frac{\pi}{32}\right),\ 0 \le n < 512 \qquad (1)$$

$$g_l(n) = 0,\ \text{otherwise},\ 512 \le n < N$$

In Equation 1, $g_l(n)$ denotes a synthesis filter value corresponding to an lth sub-band, and d(n) denotes a synthesis filter bank coefficient. As described above, synthesis filter bank coefficients may be defined in the MP3 specification corresponding to the MP3 standard. Also, k denotes a sub-band value, and when a frequency band is split into 32 sub-bands, k may be a natural number between 0 and 31. In addition, n may be defined in a certain specification.

The synthesis filter bank coefficients may be included in a bitstream received by a decoding apparatus and extracted by any one of the decoding core unit 510, the synthesis filter unit 576, and an overall controller (not shown) of the decoding apparatus.

A coefficient-corresponding value corresponding to the synthesis filter bank coefficient to be multiplied by the synthesis filter unit 576 may be obtained by performing FFT of the above-described synthesis filter value $g_l(n)$ $$G_l(k)=\mathrm{FFT}(g_l(n)),0\le k<N \qquad (2)$$

Equation 2 indicates a value $G_l(k)$ corresponding to a synthesis filter bank coefficient to be multiplied.

Figure 7:
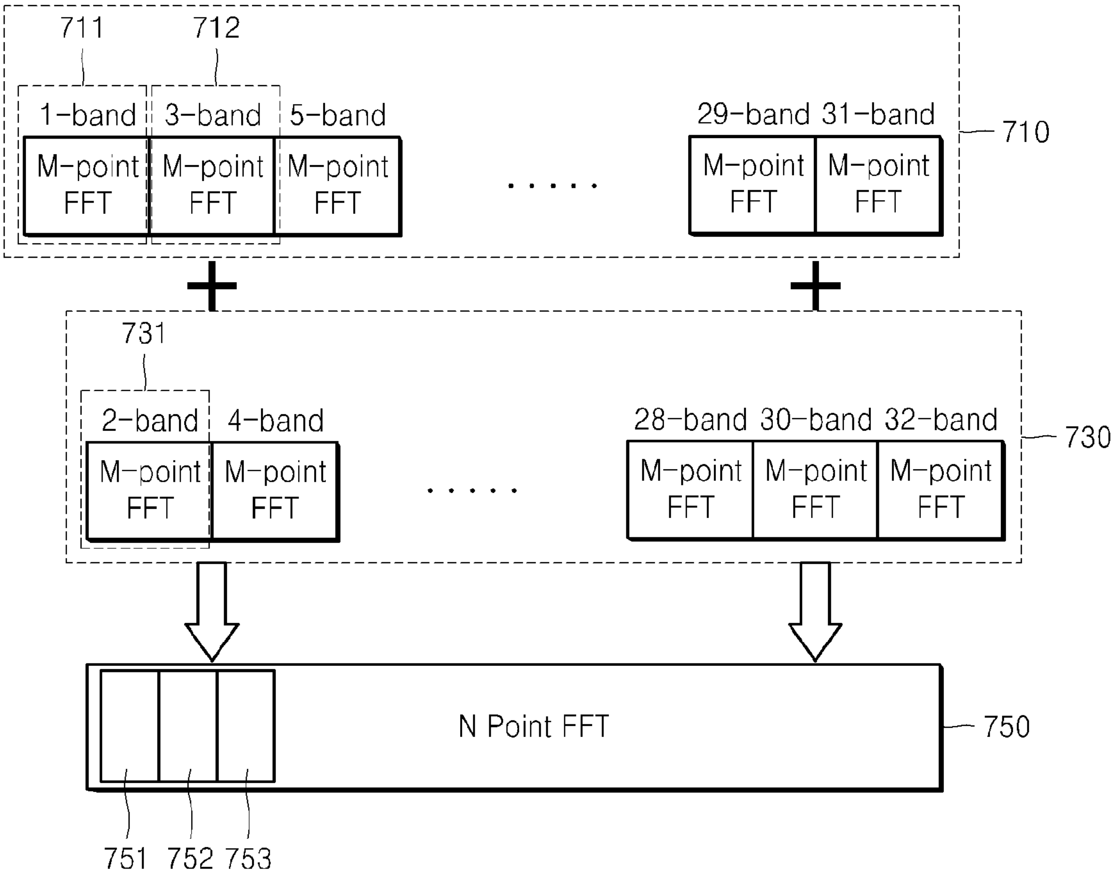
FIG. 7 is a conceptual diagram for describing an operation of a multiplexer of FIG. 5, according to an exemplary embodiment.

FIG. 7 is a conceptual diagram for describing an operation of a multiplexer 580 of FIG. 5, according to an exemplary embodiment.

First to nth synthesis audio signals corresponding to first to nth sub-bands may have M-point FFT values. A block 710 denotes synthesis audio signals corresponding to odd-th sub-bands, and a block 720 denotes synthesis audio signals corresponding to even-th sub-bands.

Referring to FIG. 7, 711 denotes a synthesis audio signal corresponding to a first sub-band, 731 denotes a synthesis audio signal corresponding to a second sub-band, and 712 denotes a synthesis audio signal corresponding to a third sub-band. FIG. 7 illustrates a case where n is 32.

The multiplexer 580 outputs an audio signal 750 having an N-point FFT value by multiplexing the first to nth synthesis audio signals corresponding to the first to nth sub-bands. In the audio signal 750 output by the multiplexer 580, signal bands 751, 752, and 753 may respectively correspond to the first synthesis audio signal 711, the second synthesis audio signal 731, and the third synthesis audio signal 712.

That is, the multiplexer 580 may generate an audio signal having the N-point FFT value that is a large point FFT value by multiplexing synthesis audio signals having M-point FFT values that are small point FFT values.

Since an IFFT unit 590 corresponds to the IFFT unit 490 of FIG. 4, the IFFT unit 590 is not described again.

Figure 8:
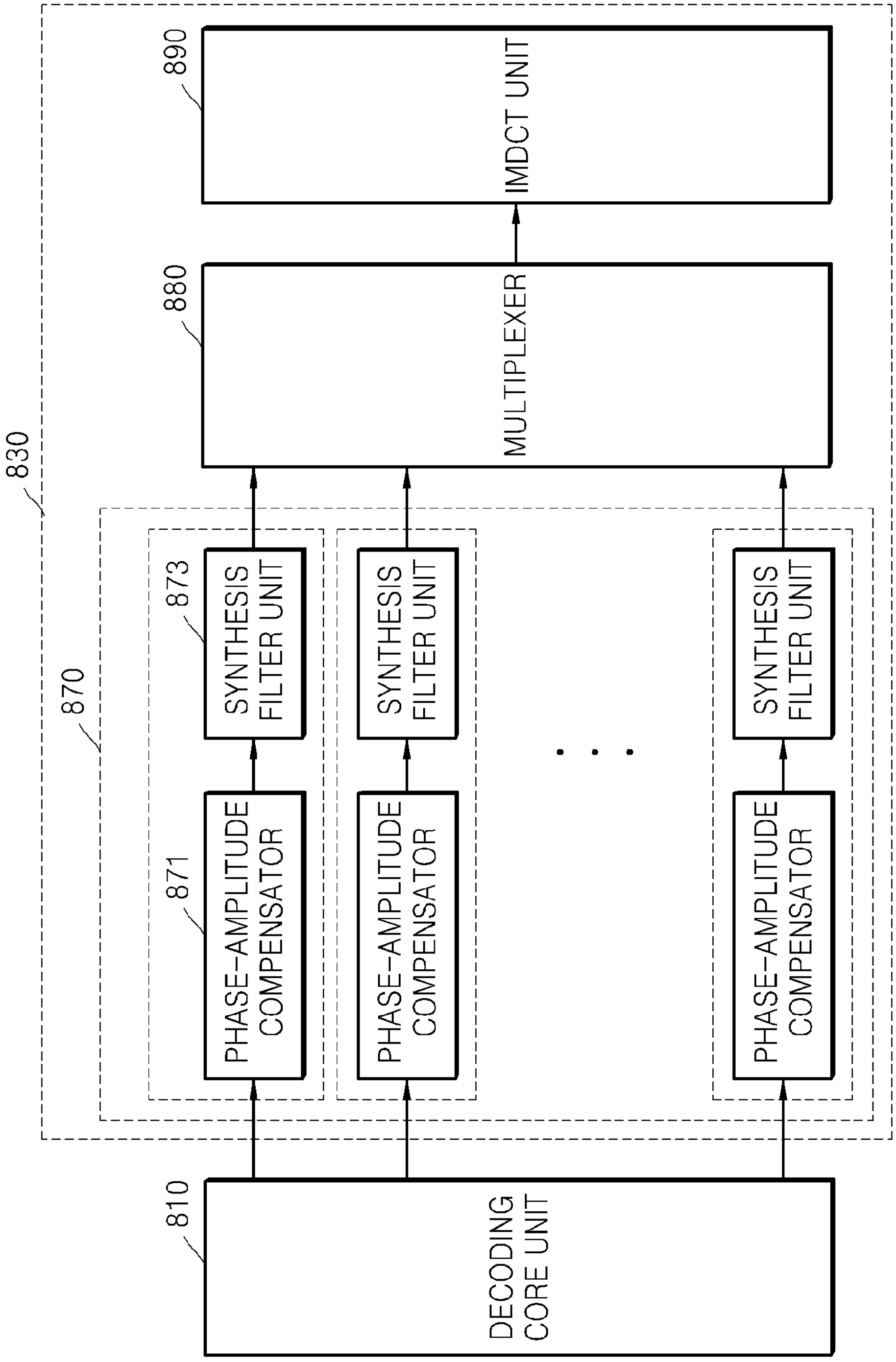
FIG. 8 is a detailed block diagram of a synthesis unit of FIG. 1, according to another exemplary embodiment.

FIG. 8 is a detailed block diagram of the synthesis unit 130 of FIG. 1, according to another exemplary embodiment.

Referring to FIG. 8, a synthesis unit 830 of FIG. 8 is similar to the synthesis unit 530 of FIG. 5 except for a connection relationship of an IMDCT unit 890. In addition, compared with the synthesis unit 530 of FIG. 5, the synthesis unit 830 does not include the FFT units 453 and the IFFT unit 590. Since the other components of the synthesis unit 830 of FIG. 8 are the same as the synthesis unit 530 of FIG. 5, a detailed description thereof is omitted herein. In addition, a decoding core unit 810 may correspond to the decoding core unit 210 of FIG. 2. Also, the decoding core unit 810 may split a decoded bitstream into n sub-band signals.

In detail, the IMDCT unit 890 corresponding to the IMDCT units (e.g., reference numeral 452) of FIG. 5 may be disposed downstream of a multiplexer 880.

The IMDCT unit 890 outputs a signal obtained by performing IMDCT on the synthesis audio signals multiplexed by the multiplexer 880.

The synthesis unit 830 does not include a component corresponding to the band transform unit 550 of FIG. 5. Accordingly, a multiplication operation unit 870 receives the n sub-band signals output from the decoding core unit 810.

A phase-amplitude compensator 871 of the multiplication operation unit 870 receives a sub-band signal and predicts at least one of a phase and an amplitude of the received sub-band signal. The phase-amplitude compensator 871 may adjust the at least one of the predicted phase and amplitude of the received sub-band signal to match a phase and an amplitude of a synthesis filter.

A synthesis filter unit 873 receives a signal output from the phase-amplitude compensator 871 and performs the above-described multiplication operation of the received signal.

Since decoding, e.g., Huffman decoding, and channel split coding performed by the decoding core unit 810 are performed in an MDCT domain, when a multiplication operation and a multiplexing operation are performed before performing IMDCT, operations performed from the decoding core unit 810 to the multiplexer 880 may be performed in the same domain. Accordingly, operation complexity may decrease, thereby increasing operation efficiency.

As described above, a decoding apparatus according to an exemplary embodiment may be compatible with another codec for performing coding in the frequency domain by completing a synthesis operation of an audio signal in the frequency domain.

In addition, since a multiplication operation is used for audio signal synthesis, complexity may decrease compared with other audio signal synthesis operations including a convolution operation, thereby increasing an operation speed.

In addition, since a decoding operation is performed in the frequency domain rather than in the time domain, sound quality may increase.

Figure 9:
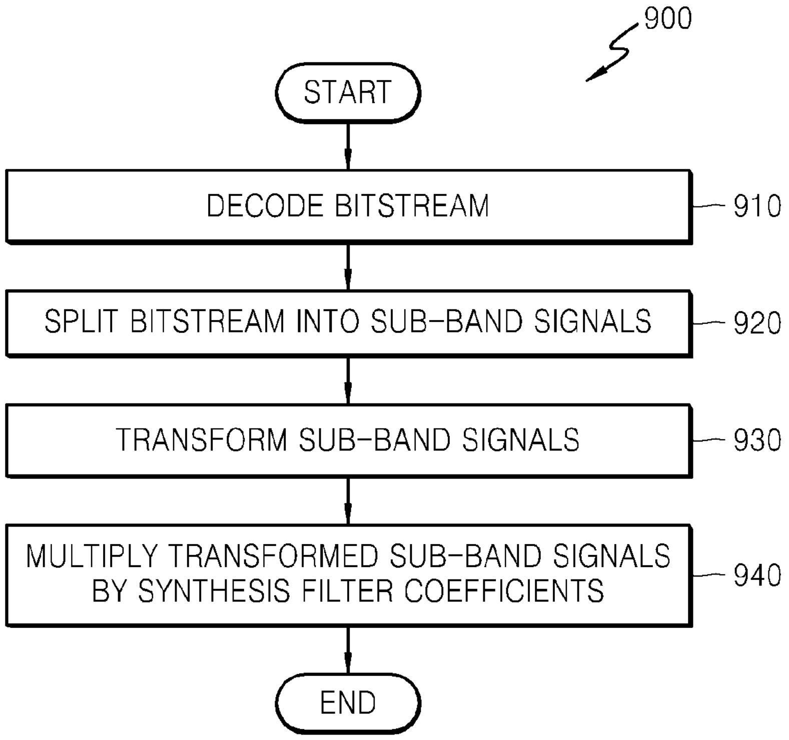
FIG. 9 is a flowchart illustrating a method of restoring an audio signal, according to an exemplary embodiment.

FIG. 9 is a flowchart illustrating an audio signal restoring method 900 according to an exemplary embodiment. Hereinafter, the audio signal restoring method 900 is described with reference to FIGS. 3 and 9.

Referring to FIG. 9, the audio signal restoring method 900 is a method of restoring an audio signal by using the decoding apparatus 300.

In operation 910, the audio signal restoring method 900 decodes a bitstream received by the decoding apparatus 300. Operation 910 may be performed by the decoding core unit 310.

In operation 920, the bitstream decoded in operation 910 is split into n sub-band signals. Operation 920 may be performed by the decoding core unit 310 or the band splitting unit 340.

In operation 930, n transformed sub-band signals are generated by transforming the n sub-band signals generated in operation 920 in the frequency domain. Operation 930 may be performed by the band transform unit 350.

In operation 940, n synthesis audio signals are generated by multiplying the n transformed sub-band signals by values corresponding to respective synthesis filter coefficients. Operation 940 may be performed by the multiplication operation unit 370.

The audio signal restoring method 900 is identical to operational configurations and technical spirits of the decoding apparatuses described with reference to FIGS. 1 to 8. Accordingly, a detailed description of the audio signal restoring method 900 is omitted.

The signal processing method can also be embodied as computer-readable codes or programs on a computer-readable recording medium. The computer-readable recording medium is any data storage device that can store programs or data which can be thereafter read by a computer system. Examples of the computer-readable recording medium include read-only memory (ROM), random-access memory (RAM), CD-ROMs, magnetic tapes, hard disks, floppy disks, flash memory, optical data storage devices, and so on. The computer-readable recording medium can also be distributed over network coupled computer systems so that the computer-readable code is stored and executed in a distributed fashion. Moreover, the "units" described herein may be implemented by one or more central processing units (CPUs), either alone or in combination with one or more external memories.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A method comprising of generating synthesis audio signals, the method comprising:
- decoding a bitstream;
- splitting the decoded bitstream into n sub-band signals;
- generating n transformed sub-band signals by transforming the n sub-band signals in a frequency domain;
- adjusting at least one of a phase and an amplitude of each of the n transformed sub-band signals to match a frequency band of a synthesis filter comprising synthesis filter bank coefficients; and
- generating synthesis audio signals by respectively multiplying the n adjusted transformed sub-band signals by n values corresponding to the synthesis filter bank coefficients.

2. The method of claim 1, wherein the n transformed sub-band signals are generated by fast Fourier transforming the n sub-band signals.

3. The method of claim 1, wherein the generating of the synthesis audio signals is performed in the frequency domain.

4. The method of claim 1, wherein the generating of the synthesis audio signals is performed in a fast Fourier transform (FFT) domain.

5. The method of claim 1, wherein the n values corresponding to synthesis filter bank coefficients are calculated based on synthesis filter bank coefficients extracted from the bitstream.

6. The method of claim 5, wherein the n values corresponding to synthesis filter bank coefficients are obtained by fast Fourier transforming synthesis filter values calculated based on the synthesis filter bank coefficients.

7. The method of claim 1, wherein the generating of the n transformed sub-band signals comprises:

inverse modified discrete cosine transforming the n sub-band signals; and generating the n transformed sub-band signals by fast Fourier transforming the n inverse modified discrete cosine transformed sub-band signals.

8. The method of claim 7, further comprising inverse fast Fourier transforming the synthesis audio signals.

9. The method of claim 1, further comprising inverse modified discrete cosine transforming the synthesis audio signals.

10. The method of claim 1, wherein the method further comprises multiplexing the synthesis audio signals.

11. The method of claim 1, wherein the decoding of the bitstream comprises:

unpacking and decoding the bitstream;

dequantizing and rearranging the decoded bitstream; and splitting the dequantized and rearranged bitstream into at least one channel.

12. A decoding apparatus comprising:

at least one processor which implements:

a decoding core unit which decodes a bitstream and splits the decoded bitstream into n sub-band signals; and a synthesis unit that generates n transformed sub-band signals by transforming the n sub-band signals in a frequency domain, adjusts at least one of a phase and an amplitude of each of the n transformed sub-band signals to match a frequency band of a synthesis filter comprising synthesis filter bank coefficients, and generates synthesis audio signals by respectively multiplying the n adjusted transformed sub-band signals by n values corresponding to the synthesis filter bank coefficients.

13. The decoding apparatus of claim 12, wherein the synthesis unit generates the synthesis audio signals in the frequency domain.

14. The decoding apparatus of claim 12, wherein the synthesis unit comprises:

a band transform unit that generates the n transformed sub-band signals by fast Fourier transforming the n sub-band signals; and a multiplication operation unit that generates the synthesis audio signals by respectively multiplying the n values corresponding to synthesis filter bank coefficients by the n adjusted transformed sub-band signals, wherein the n values corresponding to synthesis filter bank coefficients are calculated based on synthesis filter bank coefficients extracted from the bitstream.

15. The decoding apparatus of claim 14, wherein the band transform unit comprises:

an inverse modified discrete cosine transform (IMDCT) unit that inverse modified discrete cosine transforms the n sub-band signals; and a fast Fourier transform (FFT) unit that generates the n transformed sub-band signals by fast Fourier transforming the output signals of the IMDCT unit.

16. The decoding apparatus of claim 15, wherein the synthesis unit comprises:

a multiplexer that multiplexes the synthesis audio signals corresponding to the n sub-band signals; and an inverse FFT (IFFT) unit that inverse fast Fourier transforms the output signal of the multiplexer.

17. The decoding apparatus of claim 14, wherein the multiplication operation unit comprises:

a phase-amplitude compensator that adjusts at least one of the phase and the amplitude of the each of the n transformed sub-band signals to match the synthesis filter; and a synthesis filter unit that generates the synthesis audio signals by multiplying the n transformed sub-band signals adjusted by the phase-amplitude compensator by the n values corresponding to synthesis filter bank coefficients.

18. The decoding apparatus of claim 12, wherein the decoding core unit comprises:

an unpacking unit that unpacks the bitstream and decodes the unpacked bitstream according to a decoding method;

a dequantization unit that dequantizes and rearranges the decoded bitstream; and a channel splitting unit that splits the dequantized and rearranged bitstream into at least one channel.

19. A method comprising of generating a synthesis audio signal, the method comprising:

decoding a bitstream into at least one channel;

extracting synthesis filter bank coefficients from the bitstream; and for a channel of the at least one channel:

splitting the channel into n sub-band signals;

transforming a sub-band signal of the n sub-band signals into the frequency domain;

calculating, for the transformed sub-band signal, a value based on the extracted synthesis filter bank coefficients; and adjusting at least one of a phase and an amplitude of each of the n transformed sub-band signals to match a frequency band of a synthesis filter comprising synthesis filter bank coefficients;

multiplying the transformed sub-band signal by the calculated value to generate a synthesis audio signal.

20. The method of claim 1, wherein the generating of the synthesis audio signals comprises:

generating n synthesis audio signals by respectively multiplying the n transformed sub-band signals by n values corresponding to synthesis filter bank coefficients, wherein the n values corresponding to synthesis filter bank coefficients are calculated for each of the n transformed sub-band signals based on synthesis filter bank coefficients extracted from the bitstream.

21. The decoding apparatus of claim 12, wherein the synthesis unit generates n synthesis audio signals by respectively multiplying the n transformed sub-band signals by n values corresponding to synthesis filter bank coefficients, wherein the n values corresponding to synthesis filter bank coefficients are calculated for each of the n transformed sub-band signals based on synthesis filter bank coefficients extracted from the bitstream.

22. The method of claim 19, further comprising:

for the channel of the at least one channel:

transforming n sub-band signals into the frequency domain;

calculating, for each of the n transformed sub-band signals, n values based on the extracted synthesis filter bank coefficients; and multiplying the n transformed sub-band signals by the calculated n values to generate n synthesis audio signals.

* * * * *